United States Patent [19]

Grassl

[11] 4,128,043
[45] Dec. 5, 1978

[54] TOOL CHANGER APPARATUS

[76] Inventor: Reinhold Grassl, 142 S. Miraleste Dr., Apt. 203, Miraleste, Calif. 90732

[21] Appl. No.: 757,987

[22] Filed: Jan. 10, 1977

Related U.S. Application Data

[63] Continuation-in-part of Ser. No. 664,880, Mar. 8, 1976, abandoned.

[51] Int. Cl.² ............................................. B23C 5/26
[52] U.S. Cl. .................................. 90/11 D; 279/51; 279/109; 279/118
[58] Field of Search .......................... 90/11 D, 11 A; 279/1 TS, 51, 103, 109, 118; 408/239, 239 A

[56] References Cited

U.S. PATENT DOCUMENTS

| | | | |
|---|---|---|---|
| 2,924,152 | 2/1960 | Zettler | 90/11 D |
| 3,651,739 | 3/1972 | Wolf | 90/11 D |

FOREIGN PATENT DOCUMENTS

| | | | |
|---|---|---|---|
| 379336 | 4/1973 | U.S.S.R. | 90/11 D |

Primary Examiner—Othell M. Simpson
Assistant Examiner—J. Sipos
Attorney, Agent, or Firm—Fulwider, Patton, Rieber, Lee & Utecht

[57] ABSTRACT

There is disclosed a tool changer apparatus for rapid changing of a tool holder in a mill incorporating a draw bar having a gripper mounted on one end thereof for gripping a holding flange formed in a tool holder so retraction of such draw bar will close the collet on such flange to draw a centering taper formed in such tool holder into mating relationship with a complementary taper formed on one end of the mill spindle to center such holder. Incorporated on the opposite end of such draw bar is a tightener incorporating toggle links for holding the draw bar in its retracted position and operative upon retraction of the mill quill to release such toggle link to thereby extend such draw bar and release the tool holder from such gripper. Such first tool holder may then be removed and replaced with a second tool holder and upon extension of the quill, the toggle links will be closed to retract the draw bar and tighten the gripper about the holding flange of the second tool holder and center such second tool holder in the complementary taper of the quill.

21 Claims, 27 Drawing Figures

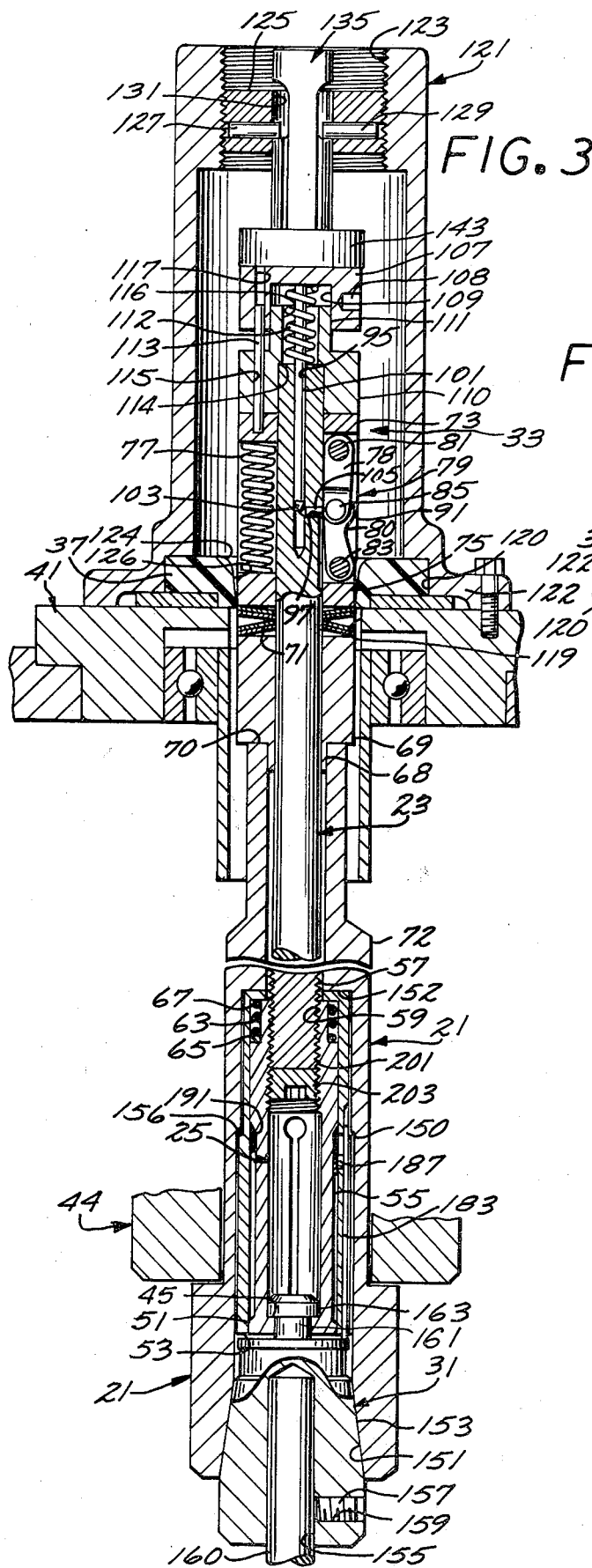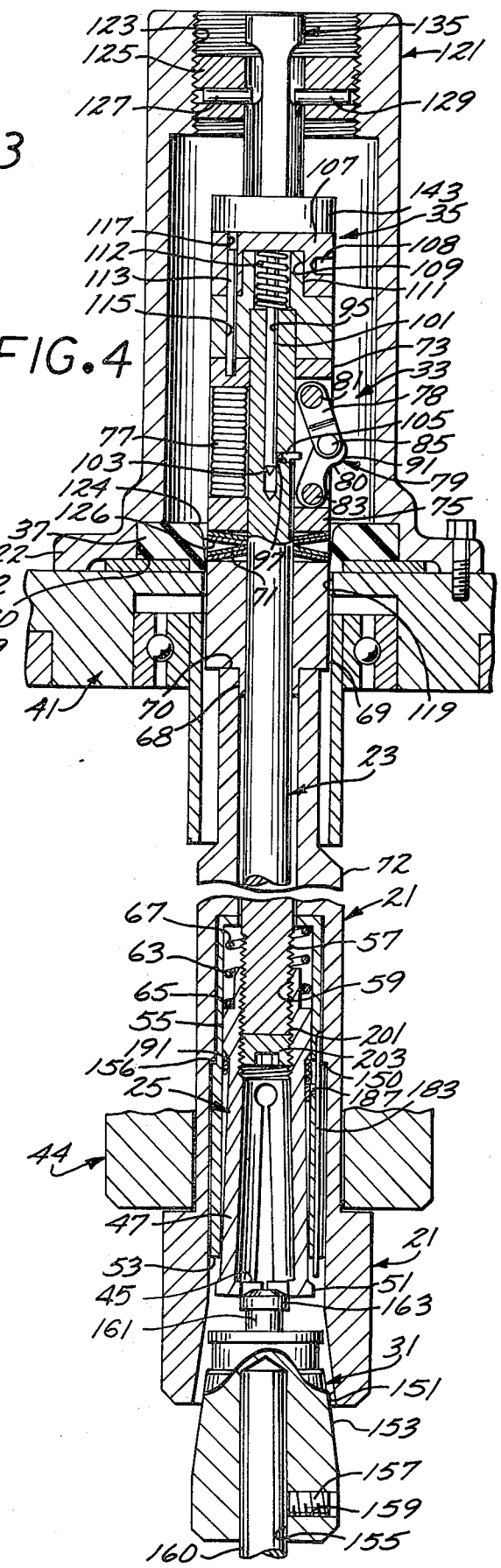

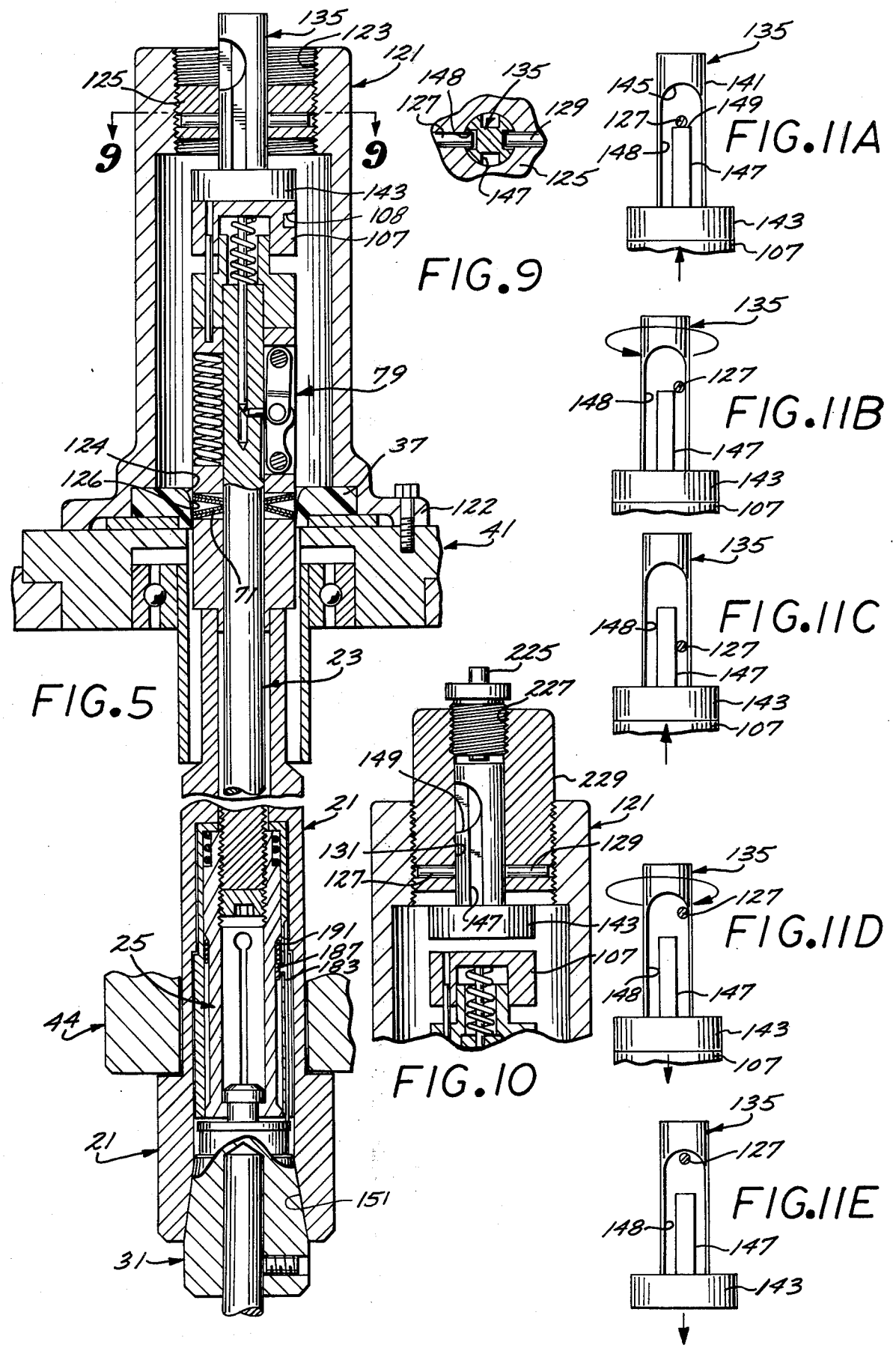

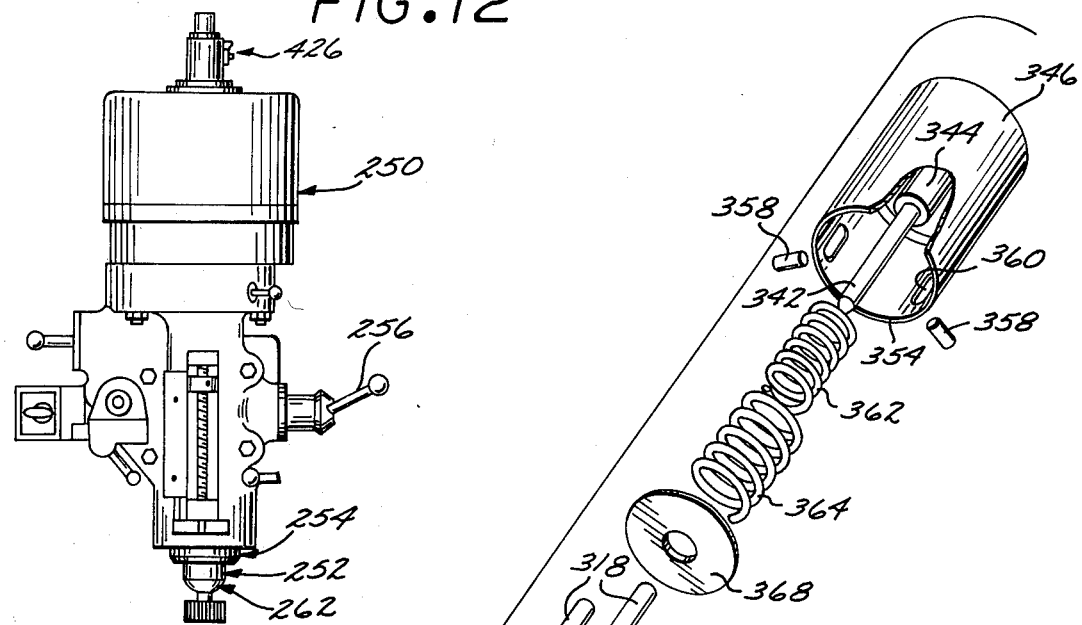
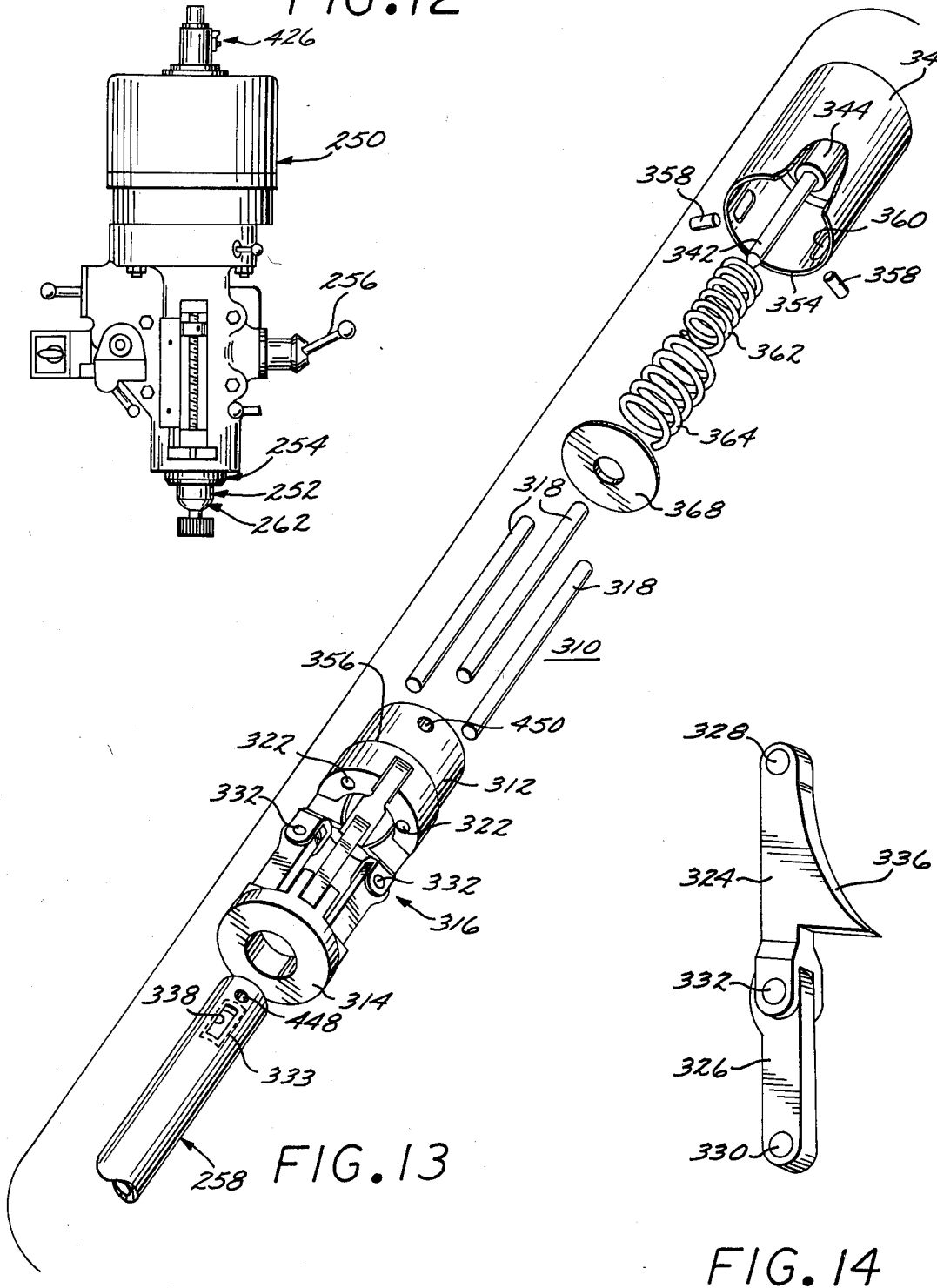

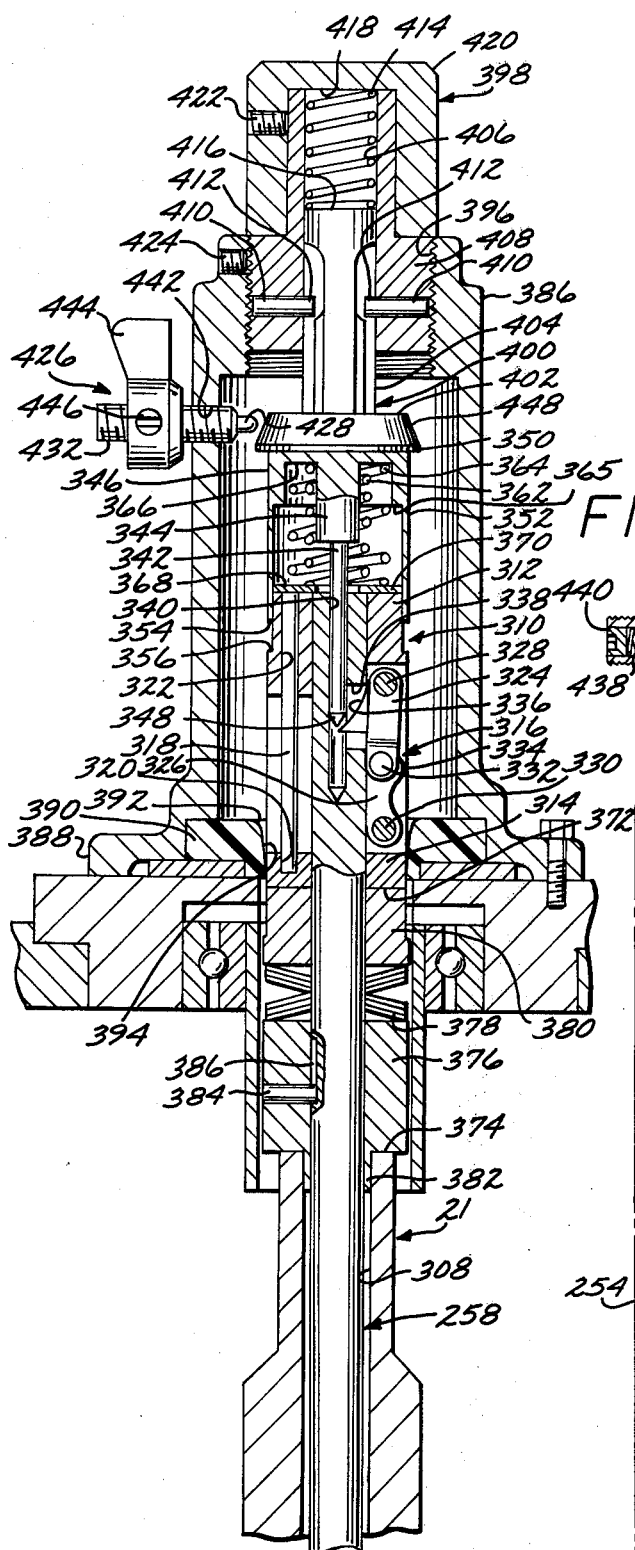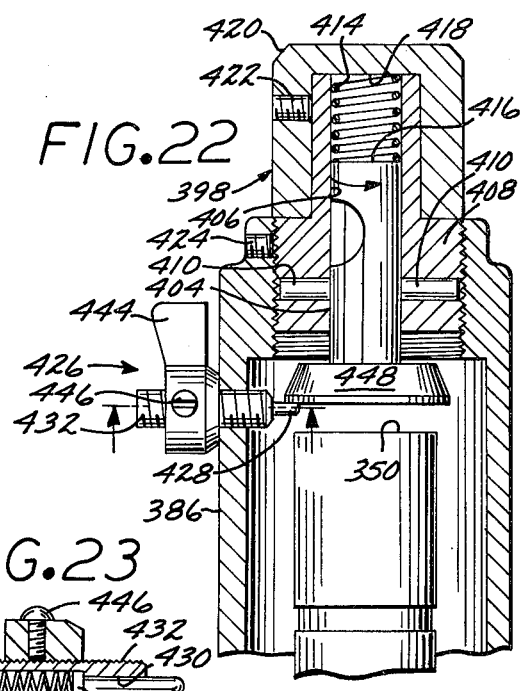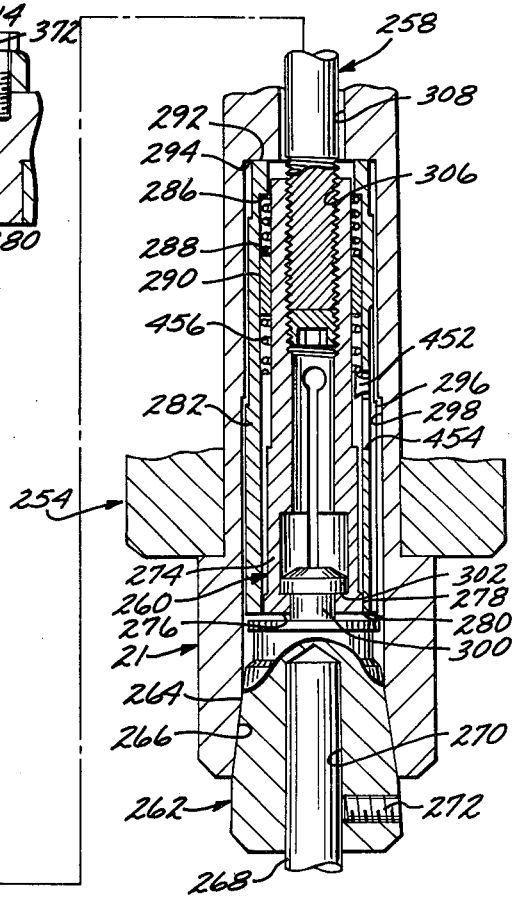

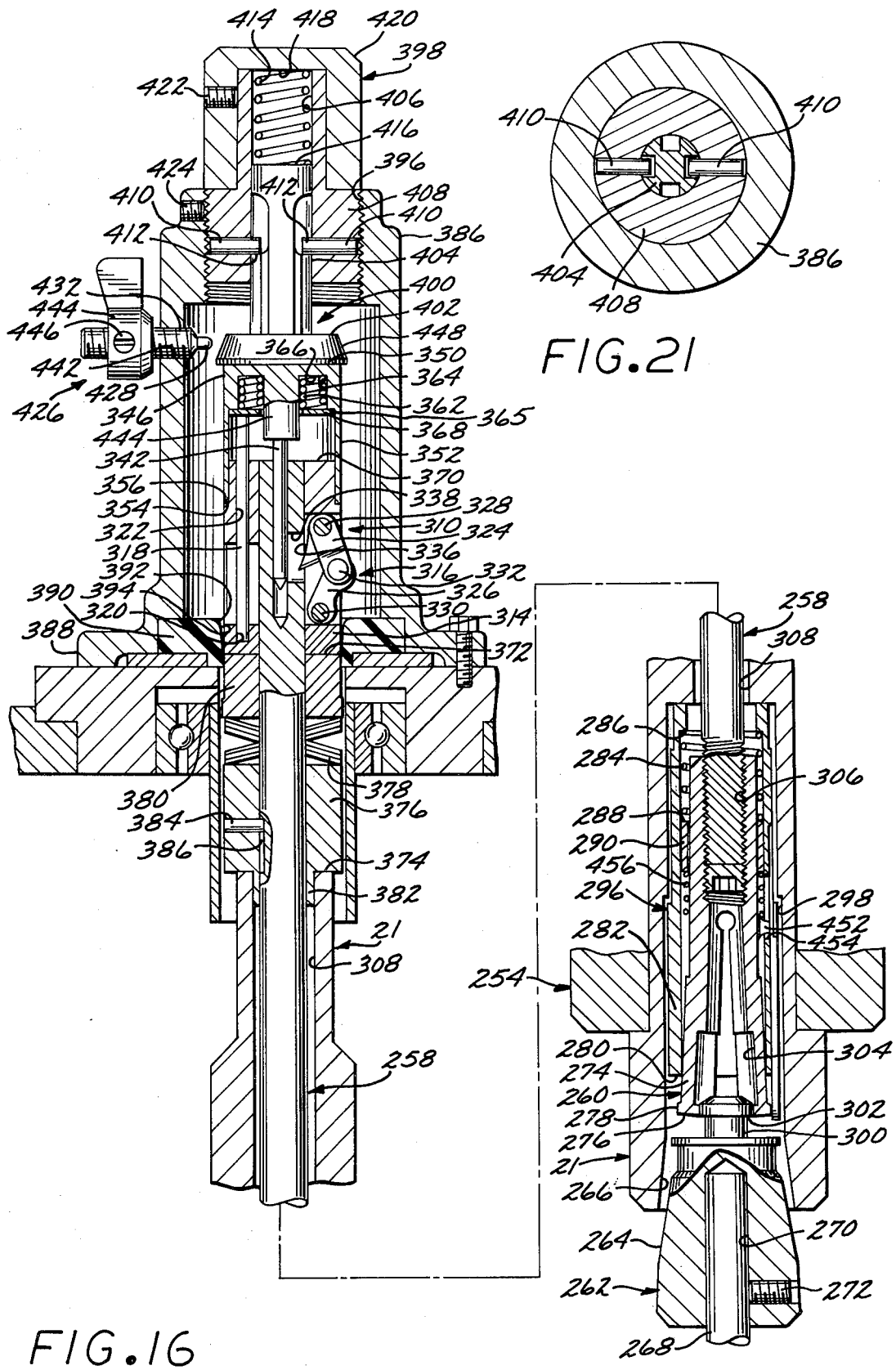

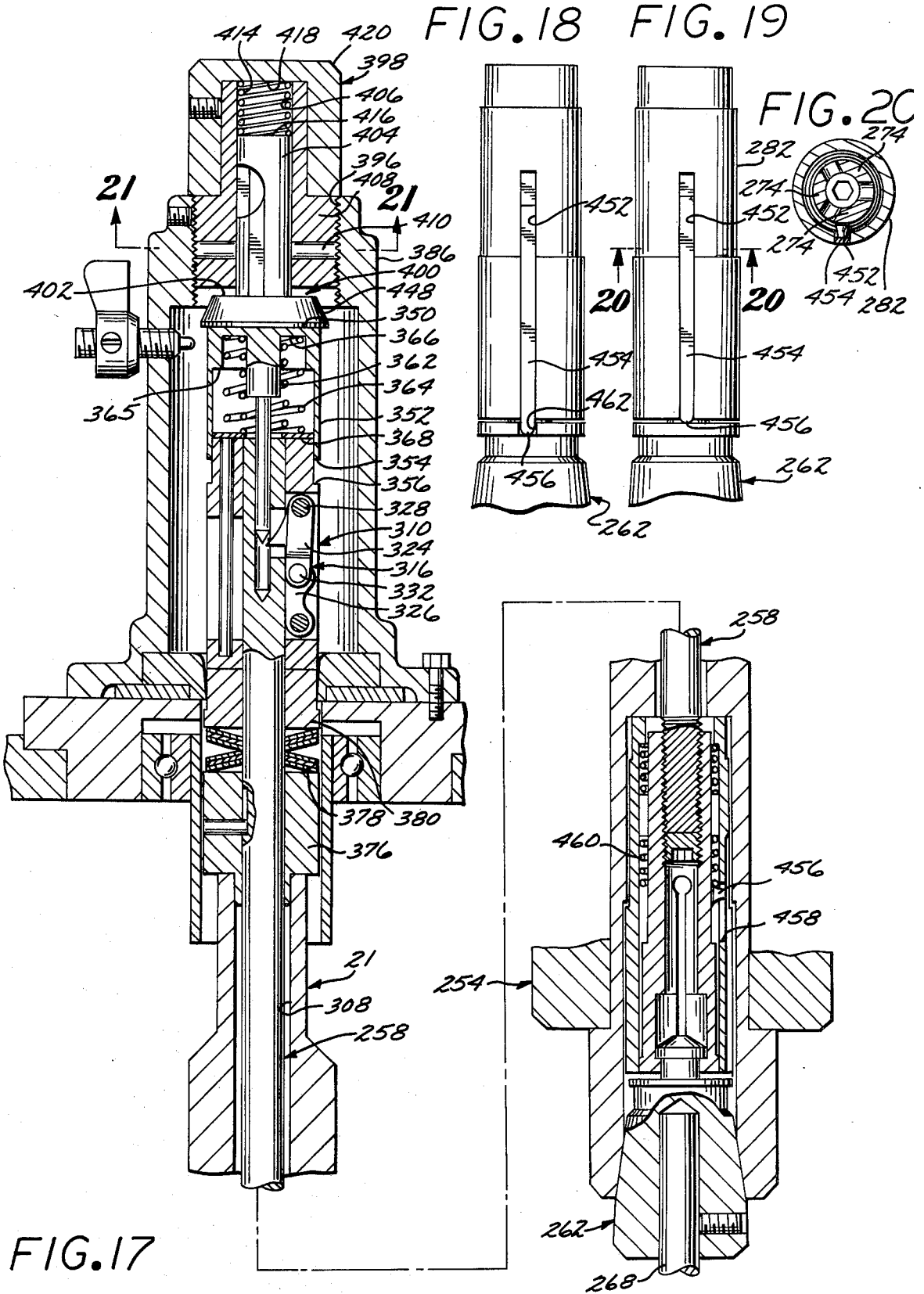

TOOL CHANGER APPARATUS

CROSS REFERENCE TO RELATED APPLICATION

This application is a continuation-in-part of U.S. Ser. No. 664,880, filed Mar. 8, 1976, bearing the same title and now abandoned.

BACKGROUND OF THE INVENTION

1. Field of the Invention

The tool changer of the present invention relates to a device for rapidly and conveniently changing a tool holder in a milling machine.

2. Description of the Prior Art

Conventional vertical milling machines incorporate a draw bar suspending a collet from the lower end thereof for radially gripping the shank of a working tool and are formed with a male tightening taper formed in the spindle upon retraction of such draw bar to center such collet and shank, as illustrated in U.S. Pat. No. 3,651,739 to Wolf. In the past, the collet was actuated either manually, by fluid pressure, as shown in U.S. Pat. Nos. 3,651,739 to Wolf, or 3,678,801 to Hague et al, and in similar structure by mechanical toggle locking devices such as that shown in U.S. Pat. No. 1,871,463 to Olson.

However, such prior art collet actuating devices were either laborious and time-consuming, such as the manually operated devices, expensive pieces of equipment, such as the fluid pressure devices, or inadequate for the desired application, such as the toggle locking devices. The present invention satisfies the need for a fast and economical draw bar actuating device for a machine tool.

SUMMARY OF THE INVENTION

The tool changer of the present invention is characterized by a draw bar having a gripper on one end thereof and incorporating a tightener on the opposite end thereof which is released upon full retraction of the milling quill to release the draw bar, thus opening the gripper to release a tool holder therefrom. The released tool holder may be replaced with a new tool holder and the quill extended causing the tightener to be actuated to tighten the draw bar to cause the gripper to be closed about the new tool holder.

In the preferred embodiment, the tightener is formed by a set of toggle links which normally project axially of the draw bar to hold such draw bar in its retracted or tightening position and are partially collapsed to release the draw bar to its extended position. The changing apparatus may also incorporate a safety feature rendering the toggle release inoperative during rotation of the spindle, thus preventing inadvertent release of the tool holder during milling operation.

BRIEF DESCRIPTION OF THE DRAWINGS

FIGS. 3 and 4 are broken sectional views, in enlarged scale, taken along the axis of the quill incorporated in the tool changer apparatus shown in FIGS. 1 and 2, and depicting a first embodiment of the changer in its tightened and released positions, respectively;

FIG. 5 is a vertical sectional view similar to FIG. 3 but depicting a safety device rendering the tool release inoperative;

FIG. 9 is a partial transverse sectional view taken along the line 9—9 of FIG. 5;

FIG. 10 is a partial vertical sectional view similar to FIG. 5 but depicting a manual release for the safety device;

FIGS. 11A–11E are diagrammatic views of a safety device incorporated in the tool changers shown in FIGS. 1–5;

FIG. 12 is an elevational front view of a vertical mill incorporating a second embodiment of the tool changer apparatus of the present invention;

FIG. 13 is an exploded perspective view of the tightener portion of the second embodiment of the tool changer apparatus;

FIG. 14 is an enlarged perspective view of the links of the toggle lock incorporated in the second embodiment;

FIGS. 15 and 16 are broken sectional views, in enlarged scale, taken along the axis of the quill incorporated in the second embodiment of the tool changer apparatus shown in FIGS. 12 and 13, and depicting the second embodiment of the tool changer in its tightened and released positions, respectively;

FIG. 17 is a vertical sectional view similar to FIG. 15 but depicting a safety device rendering the tool release inoperative;

FIGS. 18 and 19 are elevational side views, in enlarged scale, of a gripper incorporated in the second embodiment of the tool changer shown in FIG. 15, and depicting an indexing slider in its operative and retracted positions, respectively;

FIG. 20 is a transverse sectional view taken along the line 20—20 of FIG. 19;

FIG. 21 is a transverse sectional view taken along the line 21—21 of FIG. 17;

FIG. 22 is a partial vertical sectional view similar to FIG. 15 but depicting a lockout device for the safety mechanism; and FIG. 23 is an enlarged partial sectional view taken along the lines 23—23 of FIG. 22.

DESCRIPTION OF THE PREFERRED EMBODIMENTS

Figure 1:
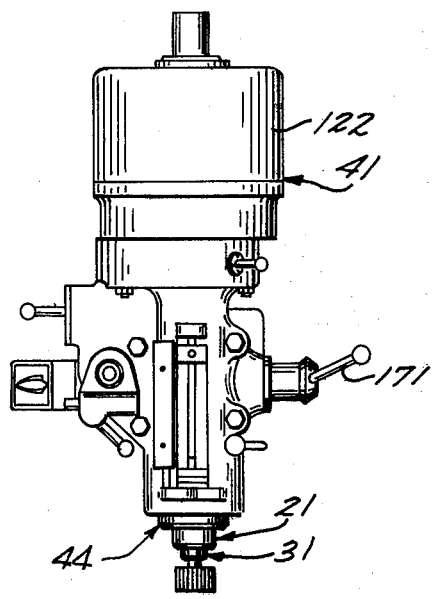
FIGS. 1 and 2 are elevational front views of a vertical mill incorporating the tool changer apparatus of the present invention and showing the quill in its retracted position with the tightener being operative in FIG. 1 and inoperative in FIG. 2, respectively.

Referring to FIGS. 1–5, a first embodiment of the tool changer apparatus of the present invention includes, generally, a hollow rotary spindle 21 having a draw bar 23 extending axially downwardly therefrom to mount a tapered gripper 25 on the bottom extremity thereof for selectively holding a tool holder 31. The gripper 25 is closed on the tool holder 31 by retraction of the draw bar 23 upwardly within the spindle 21 and such retraction is effected by means of a tightener, generally designated 33, which is selectively released upon full retraction upwardly of the spindle 21 to actuate a release, generally designated 35, which releases the tightener 33. Actuation of the tightener is then selectively effectuated by means of an actuating collar, generally designated 37, surrounding the tightener 33 to actuate such tightener upon downward travel of the spindle 21.

Referring to FIG. 1, the tool changer of the present invention is depicted installed in a conventional vertical milling machine housed in a housing, generally designated 41. Referring to FIGS. 1 and 5, such machines conventionally carry the spindles 21 in vertically traveling quills, generally designated 44, and the spindles carry split collets (not shown) within their lower extremities, such collets generally being in the form of cylindrical hollow tubes having three downwardly projecting and radially outwardly biased fingers which are formed about their lower extremities with conical male tapers that mate with female tapers 151 in such spindles as such collets are drawn upwardly in such spindles to thus press the collet fingers radially inwardly to grip cylindrical tool shanks (not shown) therein. Commonly, such collets are suspended from draw bars (not shown) similar to the draw bar 23 and threaded on its lower extremity to be received in a threaded bore in such collet so manual rotation thereof retracts the collet up within the taper 151 to close such collet on its tool shank.

In the present invention, the conventional draw bar and collet are discarded and replaced by the draw bar 23 and gripper 25. The gripper 25 is in the form of a longitudinally split tube to form three downwardly projecting and radially outwardly biased fingers.

Conventional changing of tools by manual rotation of a draw bar to retract a collet to close the fingers of such collet on a cylindrical tool shank suffers the shortcoming that the changing procedure itself is rather tedious and time-consuming and results in each different tool having its cutting point or surfaces disposed in different, unpredictable axial and radial locations, thus requiring the tool to be re-indexed with respect to the work piece each time the tool is changed. Thus, each setup time may be typically on the order of five or six minutes.

As best seen in FIGS. 3 and 4, the gripper 25 is constructed of tubular spring steel and is split axially from its bottom end to form three downwardly projecting and radially outwardly biased fingers 47 formed at their lower extremities with radially inwardly projecting gripping lips 45. The fingers 47 are also formed at their lower extremities with radially outwardly projecting conical closing flanges 51 which engage the bottom extremity 53 of a surrounding tubular closer 55 upon retraction upwardly thereinto of the gripper 25 itself, as shown in FIG. 3.

Still referring to FIG. 3, the closer 55 is biased upwardly with respect to the gripper 25 by means of a compression coil spring 63 co-acting between a shoulder 65 formed in the top extremity of such gripper and a radially inwardly turned annular flange 67 formed at the upper extremity of the closer 55.

With continued reference to FIG. 3, the spindle 21 includes a tubular housing 72 terminating at its upper end 70 in a circular opening which telescopically receives a downwardly projecting annular shell 68 formed by a support collar 69, such support collar having a series of Belville springs 71 stacked thereon for urging against the lower end of the tightener assembly 33.

The tightener assembly 33 is in the form of upper and lower rings 73 and 75, respectively, which are urged axially apart by means of spacer springs 77 and are selectively locked in their axially spaced apart tightening position by means of three toggle locks, generally designated 79, spaced apart equal distances at 120° about the periphery of such tightener. The toggle locks 79 are formed by upper and lower links 78 and 80 which are connected at their respective upper and lower extremities to the upper and lower rings 73 and 75 by means of respective pivot pins 81 and 83 and are then connected together at their proximate extremities by means of medial pivot pins 85 normally spaced radially inwardly from a line drawn between the end of pivot pins 81 and 83 to give the toggle effect. The lower toggle links 80 are formed at their upper extremity with semicircular actuating cams 91 which gauge with the actuating collar 37 upon downward travel of the spindle 21 as will be described hereinafter.

An axial release bore 95 extends downwardly from the top of the draw bar 23 and is intersected in the area of the tightener 33 by radially outwardly opening pusher bores 97 which are aligned with the respective toggle locks 79. Received telescopically within the axial release bore 95 is a release pin 101 formed on its lower extremity with a tapered point 103 which selectively engages the radially pointed inner extremities of respective pusher rods 105 received in the pusher bores 97 to push such pushers outwardly to engage the locks 79 medially and urge them outwardly over center to release the tightener 33.

Referring to FIG. 3, the release pin 101 depends at its upper end from the blind end of a downwardly opening central bore 109 formed in a cap 107 which telescopes over an upwardly opening cylindrical shell 111 formed by a fitting 110. The fitting 110 is formed with a through bore 116 which is enlarged-in-diameter medially to form a downwardly facing annular shoulder 114 that sits on the top end of the draw bar 23. The cap 107 is biased upwardly by means of a coil compression spring 112 telescoped about the pusher pin 101 and interposed between the top end of such draw bar and abutting the blind end of the central bore 119 109. The cap 107 is locked against rotation with respect to the draw bar 23 by means of an index pin 113 received at its lower extremity in an upwardly opening bore 115 formed in the fitting 110 and on its upper extremity in a bore 117 formed in the cap 107. The cap 107 is formed exteriorly with a radially outwardly opening bore 118 to facilitate installation thereof as described hereinafter.

Still referring to FIGS. 3 and 4, a hollow cylindrical bonnet, generally designated 121, is provided for mounting over the opening 119 formed in the housing 41 in axial alignment over the top extremity of the spindle 21 and is formed with a base flange 122 secured to the mill housing 41. The bonnet 121 has its top end wall formed with a through threaded bore 123 into which is screwed an externally threaded stop ring 125 having a pair of diametrically opposed stop pins 127 and 129 projecting radially inwardly from the opposite sides of the passage 131 formed by the center of such ring.

The bonnet 121 is formed in its lower interior extremity with a counterbore 120 for receiving the actuating collar 37 therein. Such actuating collar is formed interiorly with an upwardly facing rounded actuating shoulder to engage the cam surfaces 91 of the locks 79, as described hereinafter, and then tapers into a downwardly and radially inwardly sloped funnel 126.

A hat-shaped safety float, generally designated 135, is received at its upper extremity in such passage 131 and is normally suspended from the pins 127 and 129 as shown in FIG. 11E. Referring to FIGS. 9 and 11A–11E, the float 135 is formed with an upwardly projecting stem 141 which is increased-in-diameter at its lower extremity to form a base disk 143 against which the cap 107 (FIG. 3) abuts. The stem 141 is formed in its opposite sides with axially extending flutes 148 which terminate at their upper extremity in semicircular arches 145. Formed centrally in the flutes 148 are axially projecting ribs 147 which are formed at their upper extremity with blunt ends 149 for abutting the stop pins 127 and 129 as described hereinafter.

Referring again to FIGS. 3 and 4, separate tool holders 31 are preferably provided for each tool to be utilized in a particular operation so the tools themselves can be secured therein in advance and will be ready for rapid changing thereof as each step of the operation commences to thus shave substantial time off each tool changing step. The tool holder 31 itself is of rigid construction and is formed with a conical centering taper 153 received in the complementary female spindle taper 151. The spindle housing is formed with a bore leading upwardly from the taper 151 which is reduced-in-diameter to form a downwardly facing annular shoulder 150 which abuts against a medial external shoulder 156 formed on the closer 55. The quill bore leads upwardly further and is formed with a further reduction-in-diameter defining a downwardly facing shoulder 152 against which the top of the closer 55 abuts. The tool holder 31 is formed with an axial downwardly opening bore 155 and has a set screw 157 screwed into a radially projecting internally threaded bore 159 to selectively lock a mounting shank 160 of a tool in such holder. The holder is formed at its upper extremity with an upwardly projecting shank 161 formed at its upper extremity with an enlarged-in-diameter mounting flange 163 which is received behind the lips 45 of the gripper 25.

Figure 2:
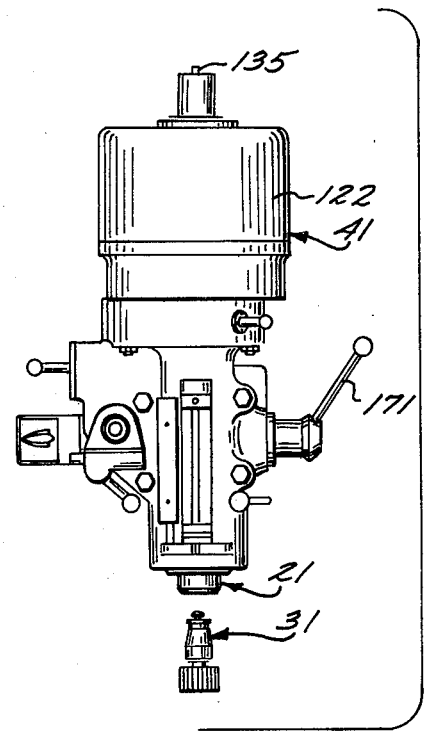

A particularly important feature of the tool changer of the present invention is the convenience and rapidity with which it may be installed in conventional vertical milling machines such as the J Model Vertical Milling Machine marketed by Bridgeport Mill Company, Bridgeport, Conn. Referring to FIGS. 1 and 2, such vertical milling machines conventionally incorporate rotary control handles 171 which may be rotated one way or the other to drive the quill 44 upwardly and downwardly with respect to the work piece (not shown).

Figure 6:
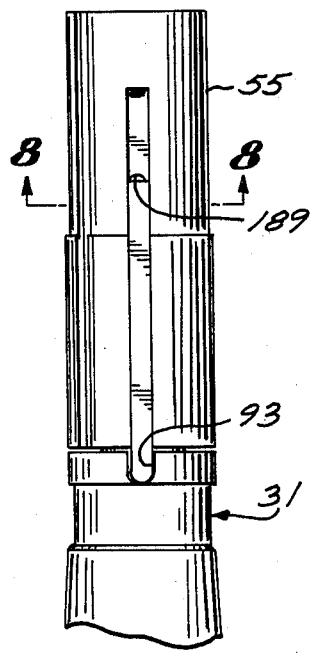
FIGS. 6 and 7 are elevational side views, in enlarged scale, of a gripper incorporated in the first embodiment of the tool changer shown in FIG. 3 and depicting an indexing slider in its operative and retracted positions, respectively.
Figure 7:
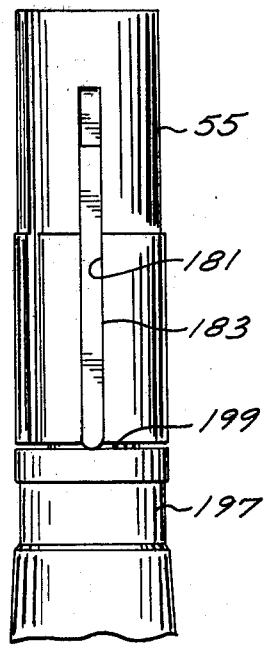
Figure 8:
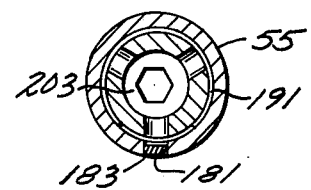
FIG. 8 is a transverse sectional view taken along the line 8—8 of FIG. 6.

Referring to FIGS. 6-8, the closer 55 has its wall formed with an axially projecting outwardly opening slot 181 which slidably receives an index slider 183 therein for vertical sliding relative thereto. The index slider 183 is formed with a radially inwardly projecting peg 187 (FIG. 5) which projects through a vertical slot 189 (FIGS. 5 and 6) formed in the wall of such closer 55 to project into the path of a compression coil spring 191 (FIG. 5) telescoped over the medial portion of the gripper 25 to normally bias such index slider downwardly to the position shown in FIG. 6. When biased downwardly as shown in FIG. 6, the lower extremity of such slider 183 registers in an upwardly opening index groove 193 formed in the upper extremity of a tool holder 31 for indexing the rotary position of a fly cutter or the like relative to the spindle 21. When a tool holder 197 (FIG. 7) or the like, holding a tool which is not dependent on the rotary position thereof for accurate cutting of the cutting point or edge, is received in the gripper 25, the upwardly facing blunt shoulder 199 of the holder 197 abuts the lower extremity of the index slider 183 and retracts it in its slot 181 thus avoiding the necessity of rotating such holder to index with such slider.

Referring to FIGS. 3 and 4, the gripper 25 is formed at its upper extremity with a through threaded vertical bore defining the threads 59 for receiving a set screw 203 therein so such set screw may be screwed upwardly against the lower end of the draw bar 23 to lock such gripper in position relative to such draw bar.

For vertical mills of the type shown in FIGS. 1 and 2, a tool changer kit including a bonnet 121, preassembled assembly of the draw bar 23, tightener 33 and release 35 are provided, along with a selection of tool holders 31 to enable such mills to be converted for rapid changing of tools.

In operation, when it is desirable to install a tool changer kit of the present invention in a vertical mill, the factory supplied draw bar (not shown) may be unscrewed from the collet (not shown) and withdrawn axially upwardly in the spindle housing 68. The draw bar 23 from the kit is then inserted axially downwardly into the spindle housing 41 with the bottom extremity of the support collar 69 coming to rest on the top end 70 (FIG. 4) of the spindle housing 72. A tool holder 31 with the shank 160 of a tool secured therein is then inserted in the gripper 25 and the closer and gripper assembly inserted upwardly into the lower extremity of the spindle housing 72 and the lower extremity of such draw bar then screwed into the bore of the gripper 25 defining the threads 59. Rotation of such draw bar to fully tighten the gripper and closer assembly thereon may be accomplished by insertion of an Allen wrench or the like in the bore 108 formed in the cap 107 (FIG. 4). The draw bar 23 is then screwed into the closer 55 with the tightener locks 79 loced in their tightening position shown in FIG. 3, thus partially collapsing the Belville springs 71.

It will be appreciated that drawing of the gripper 25 upwardly within the spindle housing 69 will cause the upper extremity of the closer 55 to abut the spindle shoulder 152, thus stopping further upward movement of such holder relative to the spindle, resulting in further rotation of such draw bar causing the gripper 25 to be drawn telescopically upwardly within the closer 55 and against the bias of the compression spring 63 (FIGS. 3-5) thus causing the lower extremity of such gripper to be drawn further upwardly within the closer, thereby engaging the closing flange 51 with the lower end of the closer, and forcing the lower extremity of the gripper fingers 47 radially inwardly to engage the inturned lips 45 of the respective fingers 47 beneath the holder flange 163, thus holding such flange loosely captive within the gripper. It should be noted that with the gripper 25 in its fully closed position as shown in FIG. 3, the flange 163 is rather loosely held in the radial direction, thus permitting limited radial movement thereof with respect to the axis of the spindle thereby providing for the mate between the spindle centering taper 151 and tool holder centering taper 153 (FIG. 3) to control centering of the holder itself.

Continued rotation of the draw bar 23 after mating of the complementary centering tapers 151 and 153 causes the tightener 33 to be drawn further down against the Belville springs 71 and such tightening is continued until the desired upward force is applied to the tool holder 31 to assure the integrity of the centering of the tool held by such holder. Preferably, tightening of the draw bar 23 is continued until a force of about 1500 lbs. is applied upwardly to the holder 31 with the tightener 33 in its locked position. The spindle bonnet 121 may then be mounted on the housing 41 to complete assembly of the kit.

When the quill 44 is subsequently retracted upwardly without rotation of the spindle 21 as shown in FIG. 1, the release cap 107 (FIG. 3) will be carried upwardly to engage the lower extremity of the safety float 135 thus carrying such safety float vertically upwardly to cause the blunt abutments 149 (FIG. 11A) formed by the ends of the ribs 147 to engage the respective stop pins 127 and 129 (FIG. 3) thus limiting further upward travel of such safety float 135 thereby stopping upward travel of the release cap 107 and forcing the release pin 101 axially downwardly relative to the draw bar 23 as upward travel of such draw bar continues. As the draw bar 23 continues upwardly around the release pin 101 the point 103 of such pin will engage between the radially inner extremities of the pusher pins 105 thus forcing such pushers radially outwardly as shown in FIG. 4 to engage the radially inwardly facing surface of the medial portion of the links 79 thus pushing the central pivot poins 85 of such locks radially outwardly to their over-the-center position thereby forcing the upper and lower tightener rings 73 and 75 slightly further axially apart against the bias of the Belville springs 71 and when such over-the-center condition is passed, the toggle locks 79 will collapse slightly under the force of the Belville springs 71 to the degree permitted by the spacer springs 77 which continue to maintain the rings 73 and 75 axially spaced apart. Such partial collapse of the locks 79 to the position shown in FIG. 4 permits the upper tightener ring 73 to move downwardly relative to the spindle housing 41 thus carrying the draw bar 23 downwardly a short distance as it telescopes downwardly through the lower tightener ring 75 thus enabling the gripper 25 to be urged downwardly relative to the closer 55 by means of the biasing spring 67. This carries the closing flange 51 downwardly to clear the lower extremity of the closer 55 thus freeing the lower extremity of the fingers 47 to expand radially outwardly under their inherent spring biased condition thereof to move the retaining lips 45 clear of the holding flange 163 to free the tool holder 31 for removal and replacement by a different holder.

In the embodiment shown, the closer spring 63 drives the gripper 25 downwardly in a rather abrupt movement upon release of the tightener toggle locks 79 thus concurrently moving the closing flanges 51 clear of the closer 55 and simultaneously slamming the axially lower end of the fingers 47 against the upwardly facing shoulder 164 of such holder to thereby impact such holder and drive it free of the centering taper 151 formed in the spindle housing 41 thereby hammering such holder free from any binding that may have occurred as a result of the close fit between the centering tapers 151 and 153.

With the tool holder 31 removed, the operator may have access to the lower end of the spindle 21 and may insert the Allen wrench or the like to engage the hexagonal socket of the set screw 203 to screw it upwardly to abut the top end thereof against the bottom end of the draw bar 23 to lock the gripper 25 and draw bar 23 against rotation relative to one another and consequently against relative axial movement.

A different tool holder, as for instance holder 197 (FIG. 7) holding a tool desired for a particular operation may then be selected, it being appreciated that such holder is identical in construction to the holder 31. Such holder will then be inserted upwardly into the lower extremity of the spindle to register the holding flange 163 behind the retaining lips 45 and the control handle 171 (FIG. 1) rotated to drive the quill 44 and spindle 21 downwardly with respect to the actuator collar 37 (FIG. 4). Downward travel of such spindle 21 and depending draw bar 23 will cause the cam surface 91 of the lower toggle links 80 (FIG. 4) to engage the rounded shoulder 124 formed in the actuator collar 37 thus applying a radially inwardly directed force at the medial pivot pins 85 thus driving the proximate ends of the lock links 78 and 80 radially inwardly. It will be appreciated that such downward travel of the draw bar 23 carries the release cap 107 clear of the safety float 135 thus enabling the reset coil spring 112 to raise the release cap 107 thus raising the release pin 101 upwardly to clear the radially inner ends of the pushers 105 thereby enabling such sliders to be pushed radially inwardly as shifting of the proximate ends of the lock links 78 and 80 is continued by the funnel 126 (FIG. 4) to shift such proximate ends radially inwardly past their over-the-center position to abut the surface of the draw bar 23 as shown in FIG. 3. This action of the lock links 78 and 80 is operative to drive the upper tightening ring 73 upwardly relative to the lower ring 75 thus drawing the draw bar 23 upwardly relative to the spindle housing 41 thereby retracting the gripper 25 into the closer 55. The gripper 25 is thus closed on the holder flange 163 and continued upward travel of the draw bar 23 draws the new holder 197 upwardly into the lower extremity of the spindle housing 41 under influence of the entire 1500 lbs. force supplied by the Belville springs 71 thereby centering the new holder 197 within the spindle and providing a positive axial and radial location of such holder with respect to the spindle and consequently an exact axial and radial location of the cutting point or edge with respect to such holder.

The vertical mill may then be operated in its normal manner and it will be appreciated that if the workman retracts the quill 44 and spindle 21 upwardly causing the draw bar cap 107 to engage the safety float 135 (as shown in FIG. 1), if the spindle 21 is rotating, it will rotate such float to thereby avoid release of the tightener 33. This is accomplished due to the fact that the safety float 135 is normally suspended from the stop pins 127 and 129 by means of the semicircular arches 145, as shown in FIG. 11, thus aligning the ribs 147 axially below such stop pins therebelow. However, when the float 135 is engaged by the cap 107 carried on the forwardly rotating spindle 21 as shown in FIG. 11, such cap 107 will pick the float up off the pins 127 and 129 and continued rotation thereof will cause the float 135 to be rotated thereby rotating the rib 147 to the left thus engaging the side wall of the flutes 148 with the respective stop pins 127 and 129 and resulting in the top ends 149 of such ribs 147 clearing the respective pins 127 and 129 thus freeing the float 135 to continue upward movement with the spindle itself to the position shown in FIGS. 5 and 2) to avoid providing a reactive force for activation of the tightener 33. It will be appreciated that this same safety feature is provided when the spindle 21 is rotating in the reverse direction, as shown in FIG. 11D.

Referring to FIG. 10, further safety may be provided against inadvertent release of the tool holders 31 and 197 by constructing the safety float 135 of ferromagnetic material and provision of an exteriorly threaded cylindrical permanent magnet 225 screwed into an upwardly opening threaded bore 227 formed in an interiorally and exteriorally threaded tubular cap 229 screwed into the bonnet bore 123. The stop pins 127 and 129 are conveniently carried in the cap 229 for suspension therefrom of the float 135.

Consequently, anytime the upwardly traveling spindle 21 engages the release cap 107 with the safety float 135 and carries such float axially upwardly to move such float into the field of the magnet 225, such float will be held thereagainst even upon the spindle 21 being driven downwardly and will only be released when the workman manually grasps the magnet 225 and rotates it to back it upwardly and carry its magnetic field out of the proximity of the float 135 thus freeing such float to fall downwardly to again be suspended from the stop pins 127 and 129.

Referring now to FIGS. 12-23, a second embodiment of the tool changer apparatus of the present invention is shown. The second embodiment of the apparatus is practically identical in its basic operation and function, the differences being principally in the construction and assembly of the physical elements which make up the apparatus. These differences in construction technique for the second embodiment result in an improved ease of assembly of the apparatus itself, thereby substantially reducing the costs of the tool changer kit.

Again, as for the first embodiment of the apparatus, the second embodiment of the tool changer of the present invention is to be installed in a conventional vertical milling machine such as is designated at 250 of FIG. 12. Again, such machines conventionally carry spindles 252 in vertically traveling quills 254 which are controlled by rotary motion of a handle 256.

As for the first embodiment, the conventional draw bar and collet (not shown) are removed and replaced by a draw bar 258 and gripper 260 (FIG. 16). Returning to FIG. 15, the gripper 260 is adapted to engage and hold a tool holder 262. The function of the gripper 260 and tool holder 262 are the same as described above with respect to the first embodiment of the invention. Therefore, referring to FIG. 16, the tool holder 262 includes a conical centering taper 264 and the spindle 21 includes a complementary spindle taper 266 which, in engagement, align and register a tool shank 268 mounted within a bore 270 of the tool holder 262, the shank being held in place within the bore by means of a set screw 272.

As best seen in FIGS. 15 and 16, the gripper 260 is constructed of tubular spring steel and is split axially from its bottom end to form three downwardly projecting and radially outwardly biased fingers 274 which have on their lower extremities radially inwardly projecting gripping lips 276. Projecting radially outwardly from the lower extremities of the fingers 274 are conically shaped closing flanges 278 which engage the bottom extremity 280 of a surrounding tubular closer 282 when the gripper 260 is retracted upwardly into the closer, as shown in FIG. 15.

The closer 282 is biased upwardly with respect to the gripper 260 by means of a compression coil spring co-acting between a radially inwardly turned shoulder 286 formed in the upper portion of the closer and the upper end 288 of a collar 290 fixed in place on the gripper 260. An upper end 292 of the closer 282 abuts against a radially inwardly directed flange 294 formed within the spindle 21. Thus, when the gripper 260 is in its extended position, as shown in FIG. 16, the gripper and closer 282 are forced apart by means of the spring 284 to insure that the fingers 274 will be radially outwardly extended.

As previously discussed, the tool changer apparatus of the present invention is designed to replace the original draw bar and collet arrangement and, as it is desired to match the conventional spindle 21 as closely as possible, the gripper 260 of the present invention includes a radially expanded portion 296 in its lower portion to match the pre-existing radially expanded diameter 298 within the lower portion of the spindle 21. However, as it is desired that the gripper 260 and the closer 282 fit relatively loosely within the spindle 21, a degree of clearance is provided.

The operation of the gripper 260 with respect to the tool holder 262 is substantially as described above with respect to the first embodiment. However certain features are different. Thus, the upper portion of the tool holder 262 is provided with a mounting shank 300 surmounted by a radially outwardly extending mounting flange 302 sized to clear the inward ends of the lips 276 of the fingers 274 when they are radially extended as shown in FIG. 16. In the second embodiment of the invention, the mounting flange 302 is of increased diameter compared to the first embodiment and the mounting lips 276 are similarly diametrically expanded by means of an annular recess 304 within the inner surfaces of the fingers 274. The contact surfaces of the flange 302 and lips 276 are thereby expanded for increased strength.

In operation, the tool holder 262 is inserted into the opened lower end of the spindle 21 and, prior to contact of the conical surfaces 266 and 264, the mounting flange 302 is inserted into the lower end of the gripper 260 as shown in FIG. 16. The gripper 260 is then drawn upwardly in a manner to be described below so that the conical closing flange 278 engages the lower end 280 of the closer 282 resulting in the fingers 274 being moved radially inwardly so that the lips 276 close around the shank 300 and capture the flange 302. It should be appreciated that this fit is relatively loose as described above with respect to the first embodiment, the contact providing only axial force to draw the tapers 264 and 266 into registering engagement.

The upper end of the gripper 260 terminates in an axial threaded bore 306 into which the threaded lower end of the draw bar 258 is screwed. The draw bar 258 moves axially within a spindle bore 308 through the entire length of the spindle 21. Relative axial movement of the draw bar 258 with respect to the spindle 21 to actuate the gripper 260 is provided in part by a tightener assembly 310 mounted on the upper end of the spindle 21. The tightener assembly includes upper and lower rings 312 and 314, respectively, which are maintained in a spaced relationship by means of three toggle locks 316 spaced equally spart at 120° around the rings 312 and 314. Interspaced between the toggle locks 316 are three spacing rods 318 which are fixed in bores 320 in the lower ring and which can slide in through bores 322 in the upper ring 312.

The toggle locks 316 are formed by upper and lower links 324 and 326, respectively, connected at their upper and lower extremities by means of respective pivot pins 328 and 330 and then connected together at their proximal extremities by means of medial pivot pins 332. As discussed above, the toggle locks are in a locked condition when the medial pivot pin 332 is inward of a line joining the two pivot pins 328 and 330.

The lower toggle links 326 are formed at their upper extremity with semicircular radially outwardly facing actuating cams 334 which engage with an actuating collar 390 upon downward travel of the spindle 21 as will be described more fully below. The upper toggle links 324 are provided on their radially inward side with radially inwardly projecting tongues forming downwardly and inwardly inclined release camming surfaces 336 as is illustrated most clearly in FIG. 14. Such tongues project radially inwardly through vertically elongated slots 338 provided in the upper end of the draw bar 258. The peripheral outer surfaces of the draw bar 258 which is contacted by the toggle links 324 and 326 when in the locked position, is flattened slightly (333), as illustrated in FIG. 13, so that the toggle locks 316 project radially outwardly as little as possible.

The slots 338 communicate with an axial release bore 340 which extends downwardly from the top of the draw bar 328 past the slots 338. Received telescopingly within the axial release bore 340 is a release pusher rod 342 which is centrally mounted in a boss 344 depending from the inside of a cap 346. The rod 342 has a tapered point 348 on its lower end which is adapted to engage the cam surfaces 336 and urges the toggle locks 316 outwardly over center to release the tightener 310.

The cap 346 is generally cylindrical and closed at its top end 350 and includes the central boss 344 and a cylindrical sleeve 352 which telescopes over the upper end of the upper ring 312 with its movement limited in the downward direction by the end 354 of the sleeve abutting a radially outwardly extending shoulder 356 from the upper ring 312 and limited in its upward travel by pins 358 (FIG. 13) extending outwardly from the upper ring 312 into slots 360 in the sleeve of the cap 346. The cap 346 is normally maintained in its upper position by means of inner and outer coil springs 362 and 364, respectively, concentrically mounted around the boss 344 between an inside surface 366 of the cap 346 and an annular interface ring 368 positioned on the top surface 370 of the upper ring 312.

Between a lower surface 372 of the lower ring 314 and a top surface 374 of the spindle 21, there is provided a support ring 376 having a series of Belville springs 378 stacked thereon and a spacer ring 380 engaging the lower surface 372 of ring 314. The support ring 376 includes an annular shell 382 which depends into the opened top of the spindle 21 to provide axial registry for the draw bar 258 within the spindle bore 308. The support ring 376 is keyed for fixed axial movement along the draw bar 258 by means of a key pin 384 which slides in a longitudinal slot 386 in the draw bar. As shown in FIG. 15, the relative axial force between the draw bar 258 and spindle 21 reflected at the tapered surfaces 264 and 266 between the spindle and tool holder 262 may be adjusted by the relative position of the support collar 376 on the draw bar when the support collar and spindle are engaged. This force is provided by relative compression of the Belville springs 378 and may be adjusted by turning the entire tightener assembly 310 and draw bar 258 into the upper end of the gripper 260 as discussed above with respect to the first embodiment.

As discussed above with reference to the first embodiment, a hollow cylindrical bonnet 386 is mounted over the tightener assembly 310 and includes at its mounting surface a radially outwardly extending base flange 388 adapted to house and support an actuating ring 390 which includes a cam surface 392 and a funnel 394 for engaging the cam surfaces 334 of the toggle links 316 to close and lock the tightener assembly upon downward movement of the spindle 21.

The bonnet 386 has an opened threaded bore 396 through its top for receiving a safety float assembly 398. The float assembly 398 includes a base disk 402 for surface engagement with the top 350 of the cap 346. Extending axially upward from the base disk 402 is a fluted shank 404 which slides in a through central bore 406 of a threaded plug 408 which has a pair of stop pins 410 axially mounted therein having projections 412 into the bore 406. The operation of the stop pins 410 and fluted shank 404 is the same as described as above with respect to FIGS. 11A–11E of the first embodiment.

In the second embodiment, the float 400 is spring biased downwardly by means of a compression coil spring 414 which exerts a force between a top 416 of the shank 404 and a blind end 418 of a closing cap 420. Both the closing cap 420 and plug 408 are secured in their position by means of set screws 422 and 424, respectively.

As illustrated in FIG. 16, as the spindle 21 and tightener assembly 310 are raised, the upper surface 350 of the cap 346 engages the lower surface of the base disk 402 and, provided the spindle is not rotating, the cap will be stopped and the release pin 342 moved through the release bore 340 into engagement with the camming surfaces 336 of the toggle links 316. The rods 318 then telescope through the bores 322 on the upper ring 338 and push upwardly against the annular interface ring 368 to compress the inner and outer coil springs 362 and 364 until the annular ring abuts against an inner shoulder 365 within the cap.

If the spindle is rotating, however, the safety float assembly 398 will be rotated, as discussed with reference to FIGS. 11A–11E, pushing the float assembly upward so that the release pin 342 does not engage the camming surfaces 336 of the toggle links 332, as illustrated in FIG. 17.

When the spindle is rotating it is desirable to prevent the release of the tightener assembly 310 even if such spindle is raised to the release position. To this end, a release lockout mechanism 426 is provided. As shown in FIG. 23, the release mechanism includes a lockout detent pin 428 which telescopes in a bore 430 axially through an externally threaded carrier screw 432. A compression spring 434 applies a spring force to a flanged internal end 436 of the detent pin 428, the spring riding in an internally threaded bore 438 with the spring being held in place by means of a set screw 440 at the end of the bore 438. The lockup mechanism 426 is threaded into a threaded radial bore 442 through the side of the bonnet 386. An adjusting collar 444 is held in place on the carrier 432 by means of a set screw 446. The mechanism 426 is screwed into the interior of the bonnet 386 until the detent pin 428 is at a radial position such that a sloped surface 448 of the base 402 of the float 400 will engage and depress the detent pin as the base plate is raised. Sufficient raising of the base plate 402 will permit the detent pin 428 to snap into a lockout position holding the float 404 in an upward position, as shown in FIG. 22.

As described above, the second embodiment of the presently preferred invention has many features which facilitate assembly of the tool changer kit. This is of great importance in the assembly of the tightener, as shown in FIG. 13. As can be seen, the tightener assembly 310 includes a number of parts which are sequentially assembled with relative ease. Thus, the draw bar 258 is inserted through the lower ring 314 past the toggle links 316 and into the upper ring 312. As the draw bar 258 is to be fixed with respect to the upper ring 312, a pair of registered holes 448 and 450 are provided in the draw bar and upper ring, respectively. The holes 448 and 450 are aligned and a key pin (not shown) inserted. In the proper registered position, the camming surfaces 336 of the toggle links 316 should then be properly positioned with respect to the slots 338 and in the draw bar 258. The rods 318 are then loosely inserted in the bores (not shown) in the rings 314 and 312. The annular ring 368 is then placed on top of the assembly together with the coil springs 362 and 364 and the cap 346 including the release pin 342 inserted over all and telescoping over the upper ring 312. The slots 360 are then aligned with alignment holes similar to the hole 450 and pins 358 inserted to lock the cap 346 in place. In this manner, the entire tightener assembly 310 may be quickly and easily assembled using only a limited number of key pins.

Referring to FIGS. 18, 19 and 20, the closer 282 has its wall formed with an axially projecting outwardly opening slot 452 which slidably receives an index slider 454 therein for vertical sliding relative thereto. The index slider 454 is formed with a radially inwardly projecting peg 456 (FIGS. 15, 16 and 17) which projects through a vertical slot 458 formed in the wall of the closer 282 to project into the path of a compression coil spring 460 telescoped over the medial portion of the gripper 260 to normally bias the index slider downwardly to the position shown in FIG. 18. The lower extremity of the slider 454 registers in an upwardly opening index groove 462 formed in the upper extremity of a tool holder 262 for indexing the rotary position of a tool relative to the spindle 21. When a tool holder 262 which is not dependent upon the rotary position thereof for accurate cutting is received in the gripper 260, the upwardly facing blunt shoulder of the holder abuts the lower extremity of the index slider 454 and retracts it in its slot 452, thus avoiding the necessity of rotating the holder to index with the slider.

From the foregoing, it will be apparent that the tool changer apparatus of the present invention, as represented by the first and second embodiments described herein, provides an economical and convenient means for converting conventional mills to feature rapid tool change operations which may be accomplished in only a fraction of the time required by prior changers.

Various modifications and changes may be made with regard to the foregoing detailed description without departing from the spirit of the invention.

I claim:

1. A quick release tool changing apparatus for holding a tool holder, incorporating a holding flange formed concentrically with a frustoconical male taper, a spindle movable between a holder locking position and a holder releasing position, and comprising:

an elongated hollow spindle housing formed at one extremity with a socket defining a female taper flaring radially outwardly toward said one end and projecting axially therefrom to form a second end;
a hollow closer mounted on said one end of said spindle;
gripper means received in said closer and operable upon axial shifting in the direction opposite said one end to engage said closer and close on said flange and upon further axial shifting in that direction to engage said male taper with said female taper to center said tool holder in said socket;
an elongated draw bar connected on one end with said gripper means and projecting through said spindle housing to said second end;
an actuator mounted on said apparatus proximate said second end and including a radially inwardly facing actuating surface;
elongated locking toggle link means interposed between said second end of said spindle and said draw bar and including a pair of longitudinal toggle links pivotally connected on their remote ends from said second end of said spindle and said draw bar, respectively, and further being pivotally connected together on their proximate ends and being pivotable about such remote ends from a collapsed release position with said proximate ends disposed radially outwardly from alignment between said remote ends to a locked, tightening position with said proximate ends passing a position of alignment between said remote ends to draw said draw bar toward said one end relative to said spindle housing, one of said proximate ends being further formed with a radially outwardly facing cam surface for engaging said actuating surface upon relative longitudinal movement between said actuator and toggle link means to urge said toggle link means to said locked position; and
release means mounted on said apparatus proximate said second end of said spindle, including an axial release bore formed in said draw bar, a release pin telescopable axially in such bore and pusher means engagable between one end of said pin and the proximate ends of said links, said pin being operative upon axial shifting in one direction thereof in said bore to engage said pusher means and pivot said proximate ends of said link means radially outwardly to said releasing position to extend said draw bar to disengage said gripper means from said closer, allowing said gripper means to open thereby releasing said tool holder.

2. A quick release tool changer as set forth in claim 1 that includes:
a safety device mounted on said apparatus in axial alignment with said spindle and responsive to rotation of the spindle carried thereby to render said release means inoperative.

3. A quick release tool changer as set forth in claim 1 wherein:
said tool holder is formed with an index slot; and
said closer includes index means projecting therefrom for receipt in said slot to index said holder.

4. A quick release tool changer as set forth in claim 1 that includes:
adjustment means for adjusting the axial position of said gripper means relative to said draw bar and includes lock means for locking said gripper in position relative to said draw bar.

5. A quick release tool changer as set forth in claim 1 that includes:
means for automatically locking said safety device in position holding said release means in its inoperative mode.

6. A quick release tool changer as set forth in claim 1 for a vertical mill wherein:
said apparatus includes a safety device mounted adjacent said release means and including stop pin means and a safety float mounted in the path of said release pin upon retraction of said spindle, said float being formed with at least one flute converging on one extremity to define a centering suspension arch for suspending said float from said stop pin means, said float further including abutment means formed medially in said flute and normally disposed in vertical alignment beneath said stop pin means when said float is suspended therefrom, said float being cooperative upon engagement therewith by said rotating quill to be lifted off said arch and rotated to rotate said abustment means out of vertical alignment with said pin means.

7. A quick release tool changer as set forth in claim 1 wherein:
said draw bar is formed with a transverse radial pusher bore intersecting said release bore;
said release means includes a release pin telescoped in said release bore and formed on one extremity with a point and a pusher rod received in said pusher bore and formed with a point normally projecting into said release bore and into the path of said release pin and operative in response to engagement therewith of said release pin point to be shifted transversely outwardly; and
means for sliding said release pin in said pusher bore engage the point thereof with the point of said pusher rod.

8. A quick release tool changer as set forth in claim 1 wherein:
said toggle link includes a pair of collars arranged in spaced apart relationship about said draw bar, one of said collars being coupled to said draw bar and said other collar being coupled to said spindle and wherein said toggle link means includes a plurality of toggle links spaced equidistant around the periphery of said draw bar, spacer spring means interposed between said collars, said tightening means further including tightening spring means normally biasing said other collar in said one direction and operative upon shifting of said toggle link means to its tightening position to apply said predetermined force to said gripper means.

9. A quick release tool changer apparatus as set forth in claim 1 wherein:
said draw bar is formed with a radial pusher slot intersecting said release bore;
said release pin is formed on its extremity adjacent said pusher slot with a point; and
said pusher means includes a tongue projecting radially inwardly through said slot and formed with a release cam surface normally disposed in said release bore, in the path of said release pin, when said tightening link means is in its tightening position and engagable by said pusher pin to urge to said toggle link means to its release position.

10. A quick release tool changer as set forth in claim 9 wherein:
said toggle link includes a pair of collars arranged in spaced apart relationship about said draw bar, one of said collars being coupled to said draw bar and formed with an eccentrically disposed axial index bore and said other collar being coupled to said one collar by means of said toggle link means;
at least one index rod substantially fixed in position with respect to said other collar and being telescopically received in said index bore;
an annular ring positioned on said one collar in contact with a telescoping end of said index rod; and a cap slidably positioned on said one collar coupled to said draw bar and having compression spring means for exerting a spring force on said annular ring to maintain said collars spaced apart.

11. A quick release tool changer as set forth in claim 10 wherein:
said actuating cam surface is engagable with said cam means upon shifting of said draw bar toward said one end to shift said toggle link means to its locked position.

12. A quick release tool changer as set forth in claim 11 wherein:
said pusher/rod is axially mounted in said cap for movement therewith into engagement with said release cam surface.

13. A quick release tool changer as set forth in claim 12 wherein:
said apparatus includes a safety device mounted adjacent said cap of said release means and including stop pin means and a safety float mounted in the path of said push rod upon retraction of said spindle, said float being formed with at least one flute converging on one extremity to define a centering suspension arch for suspending said float from said stop pin means, said float further including abutment means formed medially in said flute and normally disposed in vertical alignment beneath said stop pin means when said float is suspended therefrom, said float being operative upon engagement therewith by said rotating quill to be lifted off said arch and rotated to rotate said abutment means out of vertical alignment with said pin means.

14. A quick release tool changer as set forth in claim 13 including:
lockout means for selective engagement with said safety device to hold said safety device in a position preventing engagement with said cap of said release means.

15. A quick release tool changer as set forth in claim 14 wherein:
said draw bar is substantially flattened in the area of contact with said toggle link.

16. Apparatus for selective locking and releasing a first longitudinal member, and a second longitudinal member telescoping within a bore through said first member for relative axial movement, said apparatus comprising:
locking means including at least one locking toggle link selectively movable between a locked and release position;
actuating means including an actuating surface engageable with said toggle link upon relative movement between said actuating means and both of said first and second members to move said toggle link into the locked position;
release means including a longitudinal projecting bore in said second member and at least one transverse aperture therethrough;
cam means in said aperture and engaging said toggle link; and
a release pin received in said bore and operative upon selective relative movement to engage said cam means to release said toggle link.

17. The apparatus defined in claim 16 wherein:
said toggle link includes first and second link segments each pivotally connected to one of said first and second members and medially pivotally connected together, one of said segments being formed at its medial end with a cam surface for engagement with said actuating surface of said actuating means.

18. The apparatus defined in claim 17 wherein:
said cam means is a slider movable towards said toggle link as said release pin moves to engage said slider.

19. Apparatus for selective locking and releasing relative first and second longitudinal members against longitudinal movement between said members and comprising:
locking means connected between said first and second members and including a pair of locking toggle links selectively movable between a locked and release position;
a locking cam surface formed on one transverse side of one of said toggle links and a release surface formed on the opposite transverse side thereof;
actuating means including an actuating surface engagable with said locking cam surface upon movement between said actuation means and at least one of said first and second members to move said toggle link into the locked position; and
release means including an axial release bore formed in one of said first and second members, a release pin received telescopically in said release bore and pusher means operative upon longitudinal shifting in one direction of said release pin in said release bore to engage said release surface and shift said toggle link to its release position.

20. Apparatus as set forth in claim 19 that includes:
spring means interposed between said first and second members and urging them to the toggle link locked position.

21. A quick release tool changing apparatus for holding a tool holder, incorporating a holding flange formed concentrically with a frustonconical male taper, a spindle movable between a holder locking position and a holder releasing position, and comprising:

an elongated hollow spindle housing formed at one extremity with a socket defining a female taper flaring radially outwardly toward said one end and projecting axially therefrom to form a second end;
gripper means received in said closer and operable upon axial shifting in the direction opposite said one end to engage said closer and close on said flange and upon further axial shifting in that direction to engage said male taper with said female taper to center said tool holder in said socket;
an elongated draw bar connected on one end with said gripper means and projecting through said spindle housing to said one end;
an actuator mounted on said apparatus proximate said second end and including a radially inwardly facing actuating suface;
elongated locking toggle link means interposed between said second end of said spindle and said draw bar, said link means being pivotable about such remote ends radially inwardly from a collapsed release position to a locked tightening position drawing said draw bar toward said one end relative to said spindle housing and being further formed with a radially outwardly facing cam surface for engaging said actuating surface upon relative longitudinal movement between said actuator and toggle link means to urge said toggle link means to said locked position;
release means mounted on said apparatus proximate said second end of said spindle and operative upon axial shifting thereof relative to said tightening link means to relase same and pivot said link means radially outwardly to said releasing position to extend said draw bar to disengage said gripper means from said closer allowing said gripper means to open thereby releasing said tool holder; and
a safety device mounted on said apparatus in axial alignment with said spindle and responsive to rotation of the spindle carried thereby to render said release means inoperative.

* * * * *

UNITED STATES PATENT OFFICE
CERTIFICATE OF CORRECTION

Patent No. 4,128,043               Dated December 5, 1978

Inventor(s) Grassl, Reinhold

It is certified that error appears in the above-identified patent and that said Letters Patent are hereby corrected as shown below:

In Claim 21, column 18, line 5, before "gripper", insert --a hollow closer mounted on said one extremity;--.

Signed and Sealed this

Sixth Day of October 1981

[SEAL]

Attest:

GERALD J. MOSSINGHOFF

Attesting Officer

Commissioner of Patents and Trademarks